US009616586B1

(12) United States Patent
Schrock et al.

(10) Patent No.: US 9,616,586 B1
(45) Date of Patent: Apr. 11, 2017

(54) CUTTING AND INSERTION DEVICE FOR SAP COLLECTION

(71) Applicants: Caleb Schrock, Oakland, MD (US); Jeremy Swartzentruber, Oakland, MD (US)

(72) Inventors: Caleb Schrock, Oakland, MD (US); Jeremy Swartzentruber, Oakland, MD (US)

( * ) Notice: Subject to any disclaimer, the term of this patent is extended or adjusted under 35 U.S.C. 154(b) by 23 days.

(21) Appl. No.: 14/938,576

(22) Filed: Nov. 11, 2015

(51) Int. Cl.
B26D 7/27 (2006.01)
B26D 7/02 (2006.01)
B26D 7/06 (2006.01)
B26D 3/16 (2006.01)
A01G 23/12 (2006.01)
B26D 7/01 (2006.01)

(52) U.S. Cl.
CPC .............. *B26D 7/27* (2013.01); *A01G 23/12* (2013.01); *B26D 3/166* (2013.01); *B26D 7/02* (2013.01); *B26D 7/0683* (2013.01); *B26D 2007/013* (2013.01); *Y10T 29/5142* (2015.01); *Y10T 29/5177* (2015.01); *Y10T 29/5199* (2015.01); *Y10T 29/5367* (2015.01); *Y10T 29/53961* (2015.01)

(58) Field of Classification Search
CPC ...... A01G 23/12; B26D 3/166; B26D 7/0683; B26D 7/27; Y10T 29/5176; Y10T 29/5177; Y10T 29/5185; Y10T 29/5199; Y10T 29/5137; Y10T 29/5138; Y10T 29/5142; Y10T 29/5367; Y10T 29/53961

USPC ........ 30/90.1, 92; 29/33 D, 33 T, 56.5, 56.6, 29/237, 281.1, 564.1, 564.2, 564.6; 7/157
See application file for complete search history.

(56) References Cited

U.S. PATENT DOCUMENTS

| 3,983,772 | A | * | 10/1976 | Oldham | B23D 47/06 83/245 |
| 4,523,968 | A | | 6/1985 | McCool | |
| 4,747,212 | A | | 5/1988 | Cavdek | |
| 5,224,289 | A | * | 7/1993 | Buzzell | A01G 23/14 285/361 |
| 5,335,570 | A | * | 8/1994 | Ro | B23B 5/16 493/10 |
| 5,683,541 | A | | 11/1997 | Bocchi | |
| 6,237,204 | B1 | | 5/2001 | Hoglund et al. | |
| 6,581,499 | B2 | | 6/2003 | Myers | |

(Continued)

FOREIGN PATENT DOCUMENTS

JP 06155194 A * 6/1994

*Primary Examiner* — Erica E Cadugan
*Assistant Examiner* — Michael Vitale

(57) ABSTRACT

A cutting and insertion device for cutting an elongate tube to tube sections includes a frame section, a spinning wheel, a sheave section, a first pipe, a set of clamping members, and a set of plunger members. The spinning wheel mounts a roll of the elongate tube. The sheave section is attached to the frame section to allow traversal of the elongate tube through a first pipe. The first pipe is attached adjacent to the sheave section to receive the elongate tube, and includes slits to receive a knife to slice the elongate tube exposed to the knife at the slits to form a tube section. The clamping members are attached to the frame section to clamp the sliced tube sections at opposing ends. The plunger members are attached to the frame section to insert a fitting to the plunger member at the opposing ends of the sliced tube sections.

9 Claims, 3 Drawing Sheets

(56) References Cited

U.S. PATENT DOCUMENTS

| | | |
|---|---|---|
| 7,752,699 B1 | 7/2010 | Fruzzetti et al. |
| 8,677,603 B1 | 3/2014 | Reynolds |
| 2010/0199820 A1* | 8/2010 | Quigley ................ B26D 3/161 83/27 |
| 2012/0085206 A1 | 4/2012 | Lupke et al. |

* cited by examiner

CUTTING AND INSERTION DEVICE FOR SAP COLLECTION

BACKGROUND

In the industrial collection of maple sap used in the manufacture of syrup, it is not unusual for the manufacturer to have more than thousands of taps working at a predefined time. Where the topography allows, the main and branch lines leading to the manufacturing shed are organized to transport the collected sap to the shed via gravity. In another case, if the land is fairly flat in topography, then pumps must be used. According to the conditions, each taps is removably attached to the main line using a relatively short drop line.

As we discuss about the drop lines, if the maple sap is allowed to stay idle or stagnate in any one place for a short period of time, then it may become rancid within the main line and the drop lines. Therefore, tremendous amount of care is provided, even when the sap is running, to evade low regions in the sap lines where the sap might stagnate and ultimately get spoiled. Rancid sap confined in the lines can pollute running sap traversing through the effected regions and thus spoil a whole production bulk. Likewise, after the sap has been collected, the drop lines must be washed to maintain the assembly, and thus the drop lines must be removed periodically, or even changed. Since so many number of drop lines, for example, 1000 to 10,000 according to the size of the farmland area, there is difficulty in making this many number of drop lines, especially during an overall maintenance where all the drop lines have to be changed to put new drop lines. Conventionally, drop lines are changed every 3 years and most of the time the drop lines are made via single cutting tools, which a time is consuming process considering the number of drop lines required during a specific time.

Hence, there is a long felt but unresolved need for a cutting and insertion device which can cut elongate tubes into tube sections, which can attach the sap extraction fittings on the ends of the sliced tubes simultaneously along with the cutting process thereby reducing a reasonable amount of time in the manufacturing of such drop lines.

SUMMARY OF THE INVENTION

The cutting and insertion device described herein addresses the above mentioned need for a device which can cut elongate tubes configured for tapping of sap from maple tress into tube sections, which can attach the sap extraction fittings on the ends of the sliced tubes simultaneously along with the cutting process thereby reducing a reasonable amount of time in the manufacturing of such drop lines. The cutting and insertion device disclosed herein for cutting an elongate tube to tube sections comprises a frame section, a spinning wheel, a sheave section, a first pipe, a set of clamping members, and a set of plunger members. The spinning wheel is fixedly attached the frame section and is configured to mount a roll of the elongate tube. The sheave section is fixedly attached to an end of the frame section, where the sheave section is configured to allow traversal of the elongate tube through a first pipe.

The first pipe is fixedly attached adjacent to the sheave section, where the first pipe is configured to receive the elongate tube, and comprises slits proximal to opposing ends which are configured to receive a knife hingedly connected to the frame section to slice the elongate tube exposed to the knife at the slits to form a tube section. The clamping members are fixedly attached to the frame section and positioned proximal to the opposing ends of the first pipe, where the clamping members are configured to clamp the sliced tube sections at opposing ends. The plunger members are fixedly attached to the frame section and positioned adjacent to the clamping members, where the plunger members are configured to insert a fitting to the plunger member at the opposing ends of the sliced tube sections.

In an embodiment, the sheave section comprises a driving pulley and an idle pulley configured to guide the elongate tube towards the first tube. In an embodiment, the cutting and insertion device further comprises a driving assembly fixedly attached to the frame section and positioned below the sheave section, where the driving assembly comprises an electric motor and a gearbox. The electric motor fixedly attached to the frame section, and the gearbox is configured to be driven by the electric motor, where a shaft extending from the gearbox is configured to drive the driving pulley of the sheave section, thereby pulling the elongate tube towards the first tube. In an embodiment, the cutting and insertion device further comprises a second pipe of a diameter above the first pipe, where the second pipe is axially aligned and removably attached at one of the opposing ends of the first pipe, the second pipe configured to mount a stop switch at a distal end, where the electric motor is switched off when the elongate tube extends from the first tube to the second tube and contacts the stop switch.

In an embodiment, the cutting and insertion device further comprises a set of containers positioned on opposing sides of the frame section, where the containers are configured to store the fittings. In an embodiment, the cutting and insertion device further comprises a hanger member fixedly attached to the frame section to hang the tube sections fitted with the fittings on opposing ends. In an embodiment, the clamping members further comprises spring members attached to the clamping members to provide compressive force to clamp the opposing ends of the sliced tube sections. In an embodiment, the cutting and insertion device further comprises a right foot pedal operably connected to the clamping members to open and close the clamping members. In an embodiment, the cutting and insertion device further comprises a left foot pedal operably connected to the plunger members and the knife, where the left foot pedal is configured to actuate the knife to slice the elongate tube, and to actuate the plunger members to insert the fitting to the plunger member at the opposing ends of the sliced tube sections. In an embodiment, the cutting and insertion device further comprises a master switch attached to the frame section and positioned proximal to the clamping sections, wherein the master switch is configured to switch on and switch off the cutting and insertion device.

DETAILED DESCRIPTION OF THE INVENTION

Figure 1A:
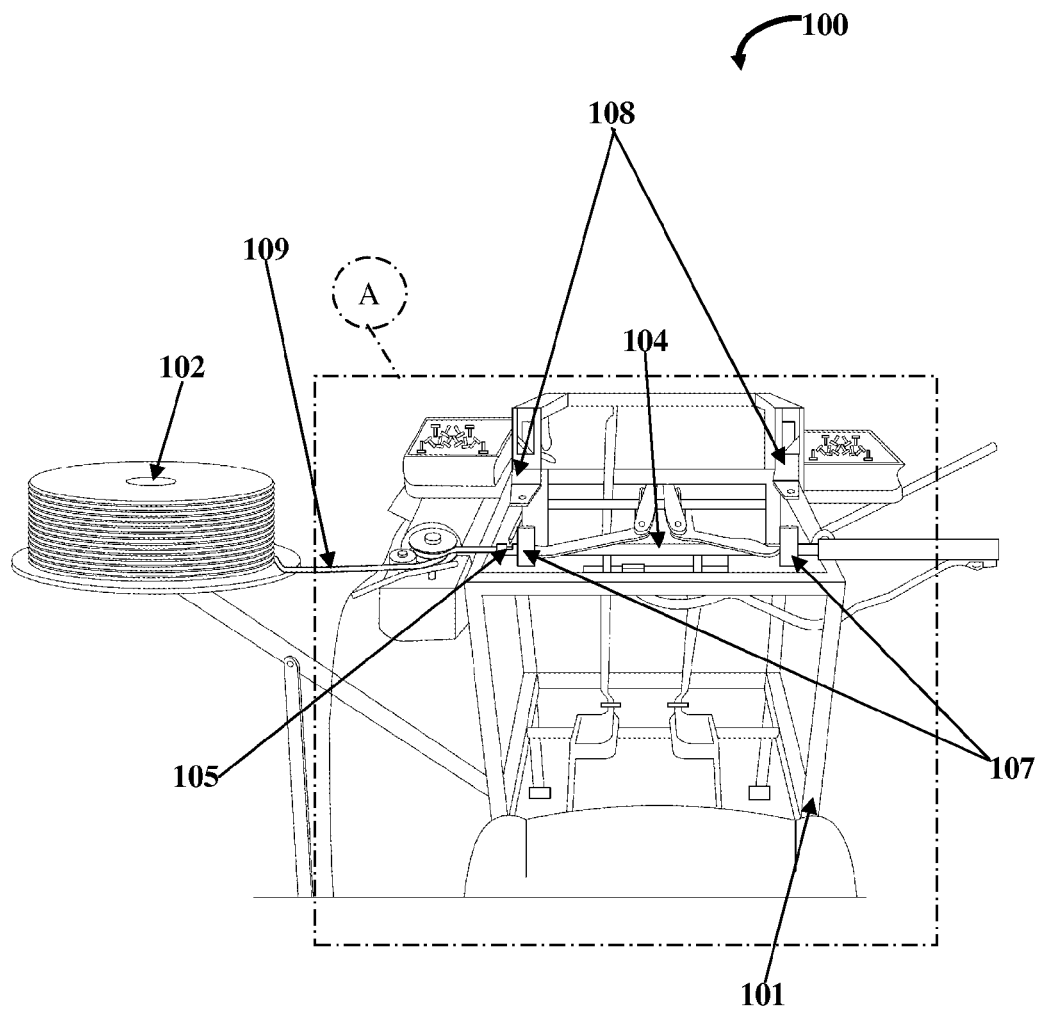
FIG. 1A exemplarily illustrates a front perspective view of the cutting and insertion device.
Figure 1B:
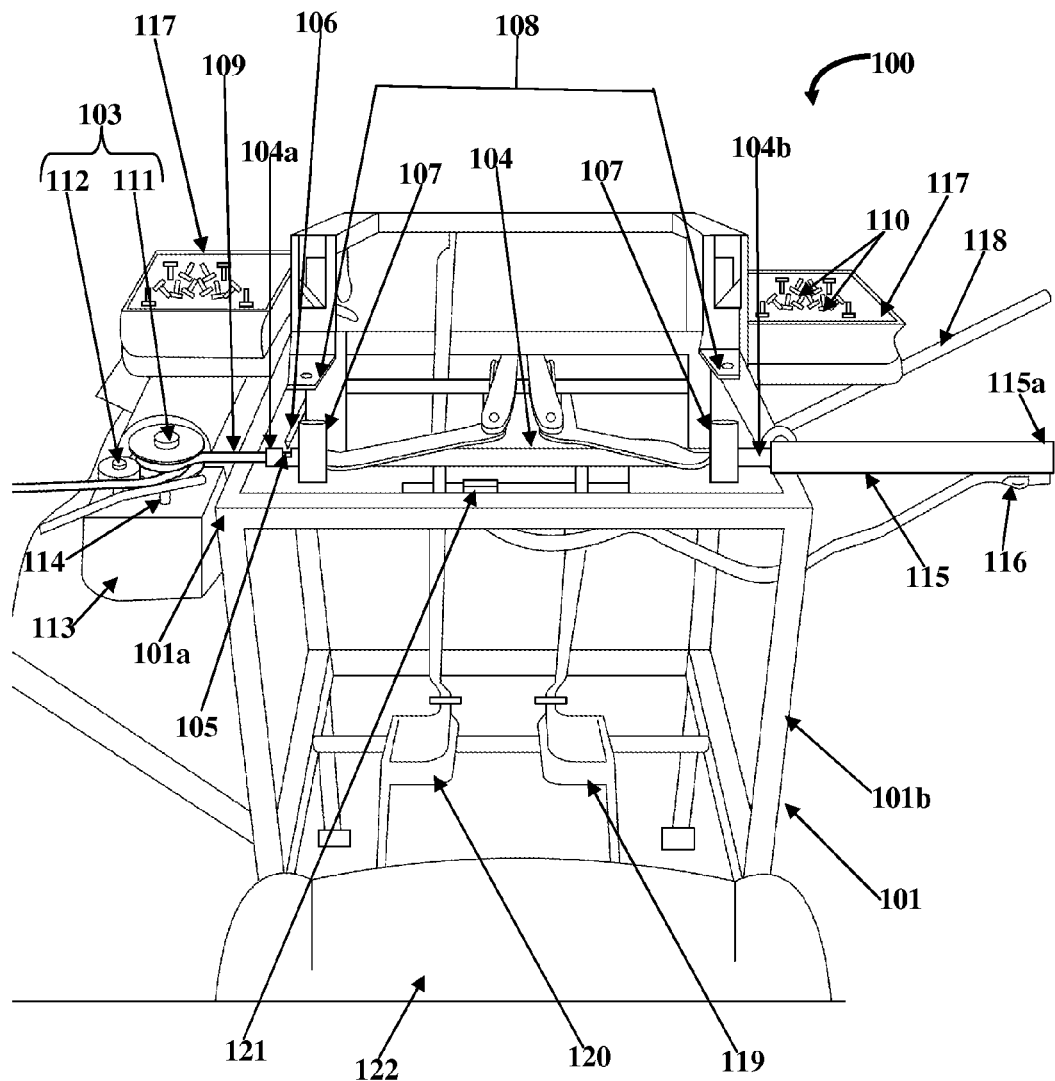
FIG. 1B exemplarily illustrates an enlarged front perspective view of the cutting and insertion device, with respect to the portion marked A in FIG. 1A.
Figure 2:
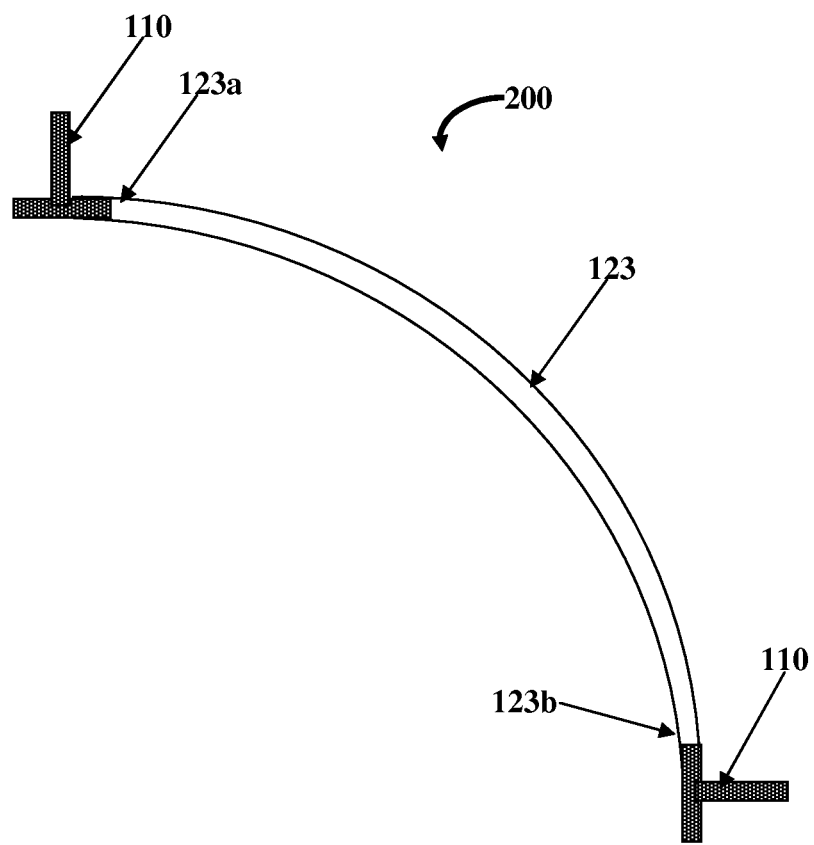
FIG. 2 exemplarily illustrates a top perspective view of the tube section with the fittings on opposing ends, forming the drop line.

FIG. 1A exemplarily illustrates a front perspective view of the cutting and insertion device 100, and FIG. 1B exemplarily illustrates an enlarged front perspective view of the cutting and insertion device 100 with respect to the portion marked A in FIG. 1A. The cutting and insertion device 100 disclosed herein for cutting an elongate tube 109 to tube sections 123, as shown in FIG. 2, comprises a frame section 101, a spinning wheel 102, a sheave section 103, a first pipe 104, a set of clamping members 107, and a set of plunger members 108. The spinning wheel 102 is fixedly attached the frame section 101 and is configured to mount a roll of the elongate tube 109. The sheave section 103 is fixedly attached to proximal to the end 101a of the frame section 101, where the sheave section 103 is configured to allow traversal of the elongate tube 109 through a first pipe 104. The first pipe 104 is fixedly attached adjacent to the sheave section 103, where the first pipe 104 is configured to receive the elongate tube 109, and comprises slits 105 proximal to opposing ends 104a and 104b of the first pipe 104 which are configured to receive a knife 106 hingedly connected to the frame section 101 to slice the elongate tube 109 exposed to the knife 106 at the slits 105 to form a tube section 123, as shown in FIG. 2. The knife 106 is, for example, a re-placable utility blade.

The clamping members 107 are fixedly attached to the frame section 100 and positioned proximal to the opposing ends 104a and 104b of the first pipe 104, where the clamping members 107 are configured to clamp the sliced tube sections 123 at opposing ends 123a and 123b, as shown in FIG. 2. The plunger members 108 are fixedly attached to the frame section 101 and positioned adjacent to the clamping members 107, where the plunger members 108 are configured to insert a fitting 110 to the plunger member 108 at the opposing ends 123a and 123b of the sliced tube sections 123, as shown in FIG. 2. After the cutting and insertion device 100 automatically calculates the predefined length of the elongate tube 109 required to be cut, the elongate tube 109 is allowed to traverse through the first tube 104. When the required length of the elongate tube 109 is received within the first tube 104, the plunger members 108 are actuated to perform two functions; firstly cutting the elongate tube 109 using the knives 106 operably attached to the plunger members 108, and then inserting the fitting 110 additionally attached to the plunger members 108 into the opposing ends of the sliced tube sections 123 as shown in FIG. 2. A tube section 123 inserted with fittings 110 into the opposing ends 123a and 123b of the tube section 123 forms the drop line 200, as shown in FIG. 2. Therefore, in a single actuation of the plunger members 108, both cutting of the elongate tube 109 and insertion of the fitting 110 into the sliced tube sections 123 is facilitated in the manufacturing of the drop line 200, as shown in FIG. 2, and therefore increases the speed of production of a large number of individual drop lines 200 within a specific time limit.

In an embodiment, the sheave section 103 comprises a driving pulley 111 and an idle pulley 112 configured to guide the elongate tube 109 towards the first tube 104. In an embodiment, the cutting and insertion device 100 further comprises a driving assembly 113 fixedly attached to the frame section 101 and positioned below the sheave section 103, where the driving assembly 113 comprises, for example, an electric motor and a gearbox. Ian example of the working of the driving assembly 113, the electric motor is fixedly attached to the frame section 101, and the gearbox is configured to be driven by the electric motor, where a shaft 114 extending from the gearbox is configured to drive the driving pulley 111 of the sheave section 103, thereby pulling the elongate tube 109 towards the first tube 104. In an embodiment, the cutting and insertion device 100 further comprises a second pipe 115 of a diameter above the first pipe 104, where the second pipe 115 is axially aligned and removably attached at one of the opposing ends 104b of the first pipe 104, the second pipe 115 is configured to mount a stop switch 116 at a distal end 115a, where the electric motor is switched off when the elongate tube 109 extends from the first tube 104 to the second tube 115 and contacts the stop switch 116.

In an embodiment, the cutting and insertion device 100 further comprises a set of containers 117 positioned on opposing sides 101a and 101b of the frame section 101, where the containers 117 are configured to store the fittings 110. In an embodiment, the cutting and insertion device 100 further comprises a hanger member 118 fixedly attached to the frame section 101 to hang the tube sections 123 fitted with the fittings 110 on opposing ends 123a and 123b of the tube sections 123 as shown in FIG. 2. In an embodiment, the clamping members 107 further comprises spring members attached to the clamping members 107 to provide compressive force to clamp the opposing ends of the sliced tube sections 123, as shown in FIG. 2. In an embodiment, the cutting and insertion device 100 further comprises a right foot pedal 119 operably connected to the clamping members 107 to open and close the clamping members 107. In an embodiment, the cutting and insertion device 100 further comprises a left foot pedal 120 operably connected to the plunger members 108 and the knife 106, where the left foot pedal 120 is configured to actuate the knife 106 to slice the elongate tube 109, and to actuate the plunger members 108 to insert the fitting 110 to the plunger member 108 at the opposing ends of the sliced tube sections 123, as shown in FIG. 2. The foot pedals 119 and 120 therefore provide less strenuous work for a user working with the cutting and insertion device 100. In an example, each plunger member 108 and clamping member 107 are adjustably positioned so that the two sides are adjusted to work at the same time so that one doesn't push ahead of the other side.

In an embodiment, the cutting and insertion device 100 further comprises a master switch 121 attached to the frame section 101 and positioned proximal to the clamping members 107, wherein the master switch 121 is configured to switch on and switch off the cutting and insertion device 100. The cutting and insertion device 100 allow automatic feeding and automatic length detection of the elongate tube 109 to be sliced and allows the cutting of both ends of the elongate tube 109 at the same time. A seat 122 is also provided for a user to sit down and work on the cutting and insertion device 100. Further, in an embodiment, the spinning wheel 102 comprises a brake member to avoid excess unraveling of the elongate tube 109.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

We claim:

1. A cutting and insertion device for cutting an elongate tube into a tube section, comprising:
   a frame section;
   a spinning wheel fixedly attached to the frame section and configured to mount a roll of the elongate tube;
   a sheave section fixedly attached proximal to an end of the frame section, the sheave section configured to allow traversal of the elongate tube through a first pipe;
   the first pipe fixedly attached adjacent to the sheave section, the first pipe configured to receive the elongate tube, and comprising slits configured to receive a knife hingedly connected to the frame section to slice the elongate tube exposed to the knife at the slits to form the tube section;
   a set of clamping members fixedly attached to the frame section and positioned proximal to opposing first and second ends of the first pipe, the clamping members configured to clamp the tube section at opposite ends thereof;
   a set of plunger members fixedly attached to the frame section and positioned adjacent to the clamping members, the plunger members configured to insert respective fittings into the opposite ends of the tube section.

2. The cutting and insertion device of claim 1, wherein the sheave section comprises a driving pulley and an idle pulley configured to guide the elongate tube towards the first pipe.

3. The cutting and insertion device of claim 2, further comprising a driving assembly fixedly attached to the frame section and positioned below the sheave section, the driving assembly comprising;
   an electric motor fixedly attached to the frame section; and
   a gearbox configured to be driven by the electric motor, wherein a shaft extending from the gearbox is configured to drive the driving pulley of the sheave section, thereby pulling the elongate tube towards the first pipe.

4. The cutting and insertion device of claim 1, further comprising a second pipe having a diameter greater than that of the first pipe, wherein
   the second pipe is axially aligned and removably attached at one of the opposing first and second ends of the first pipe, and the second pipe has a stop switch mounted thereto, wherein an electric motor is switched off when the elongate tube extends from the first pipe into the second pipe and contacts the stop switch.

5. The cutting and insertion device of claim 1, further comprising a set of containers positioned on opposing sides of the frame section, wherein the containers are configured to store the respective fittings.

6. The cutting and insertion device of claim 1, further comprising a hanger member fixedly attached to the frame section, the hanger member being provided to hang the tube section that is fitted with the respective fittings thereon.

7. The cutting and insertion device of claim 1, further comprising a right foot pedal operably connected to the clamping members to open and close the clamping members.

8. The cutting and insertion device of claim 1, further comprising a left foot pedal operably connected to the plunger members and the knife, wherein the left foot pedal is configured to actuate the knife to slice the elongate tube, and to actuate the plunger members to insert the respective fittings into the opposite ends of the tube section.

9. The cutting and insertion device of claim 1, further comprising a master switch attached to the frame section and positioned proximal to the clamping members, wherein the master switch is configured to switch on and switch off the cutting and insertion device.

\* \* \* \* \*